US011003898B2

(12) United States Patent
Fortune et al.

(10) Patent No.: US 11,003,898 B2
(45) Date of Patent: May 11, 2021

(54) CREATING VIDEOS WITH FACIAL EXPRESSIONS

(71) Applicant: BGR TECHNOLOGIES PTY LIMITED, Neutral Bay (AU)

(72) Inventors: Ronald Grant Fortune, Neutral Bay (AU); William John Bailey, Neutral Bay (AU)

(73) Assignee: BGR TECHNOLOGIES PTY LIMITED, Neutral Bay (AU)

( * ) Notice: Subject to any disclaimer, the term of this patent is extended or adjusted under 35 U.S.C. 154(b) by 16 days.

(21) Appl. No.: 16/320,966

(22) PCT Filed: Jul. 25, 2017

(86) PCT No.: PCT/AU2017/050763
§ 371 (c)(1),
(2) Date: Jan. 25, 2019

(87) PCT Pub. No.: WO2018/018076
PCT Pub. Date: Feb. 1, 2018

(65) Prior Publication Data
US 2019/0171869 A1 Jun. 6, 2019

Related U.S. Application Data

(60) Provisional application No. 62/366,406, filed on Jul. 25, 2016, provisional application No. 62/366,375, filed on Jul. 25, 2016.

(30) Foreign Application Priority Data

Jul. 25, 2016 (AU) .................................. 2016902919
Jul. 25, 2016 (AU) .................................. 2016902921

(51) Int. Cl.
*G06K 9/00* (2006.01)
*G06T 13/40* (2011.01)
(Continued)

(52) U.S. Cl.
CPC ..... *G06K 9/00315* (2013.01); *G06K 9/00281* (2013.01); *G06T 7/00* (2013.01);
(Continued)

(58) Field of Classification Search
CPC ............................ G06K 9/00; G06K 9/00315
See application file for complete search history.

(56) References Cited

U.S. PATENT DOCUMENTS 7,505,621 B1 * 3/2009 Agrawal ............ G06K 9/00288
382/118
2007/0047790 A1 * 3/2007 Dewaele .............. G06K 9/4671
382/128

(Continued)

OTHER PUBLICATIONS

International Search Report and Written Opinion for corresponding PCT Application No. PCT/AU2017/050763 dated Oct. 5, 2017 in 13 pages.

*Primary Examiner* — Myron Wyche
(74) *Attorney, Agent, or Firm* — Procopio, Cory, Hargreaves & Savitch LLP; Noel C. Gillespie

(57) ABSTRACT

The present disclosure relates to creating videos. A mobile device creates a graphic user interface to capture by the camera of the device multiple photographic facial images of a user for respective multiple facial expressions of a character in the video. Using the multiple photographic facial images, the device modifies stored character images by matching facial features of the character to facial features of the user for the multiple facial expressions of the character in the video and creates the video based on the modified character images. The facial expression of the user is used to influence the facial expression of the character. This method enables replacement of certain visual style elements with a given user's own style elements.

12 Claims, 11 Drawing Sheets

(51) Int. Cl.
*G06T 7/00* (2017.01)
*G06T 13/80* (2011.01)

(52) U.S. Cl.
CPC .............. *G06T 13/40* (2013.01); *G06T 13/80* (2013.01); *G06T 2210/44* (2013.01)

(56) References Cited

U.S. PATENT DOCUMENTS

| | | | |
|---|---|---|---|
| 2011/0299776 A1* | 12/2011 | Lee | G06K 9/00234 382/173 |
| 2013/0147788 A1 | 6/2013 | Weise et al. | |
| 2013/0215113 A1* | 8/2013 | Corazza | G06T 13/40 345/420 |
| 2015/0123991 A1* | 5/2015 | Yarosh | G02B 27/017 345/629 |
| 2016/0275341 A1 | 9/2016 | Li et al. | |

* cited by examiner

210

```
creating a user interface on the mobile device to capture by the camera
multiple photographic facial images of a user for respective multiple facial
expressions
211
            ↓
extracting a user facial feature from each of the multiple photographic facial
images
213
            ↓
storing associated with a respective facial expression identifier the user
facial feature from each of the multiple photographic facial images
215
            ↓
selecting one of the multiple user facial features based on a first facial
expression identifier associated with a first frame of the video
217
            ↓
determining a transformation that transforms a reference facial feature
associated with the first facial expression identifier into an approximation or
representation of the selected one of the multiple user facial features
219
            ↓
modifying, based on the transformation, a reference facial image of the
character associated with the first facial expression identifier and the
reference facial feature
221
            ↓
creating the first frame of the video based on the modified reference facial
image
223
```

CREATING VIDEOS WITH FACIAL EXPRESSIONS

CROSS-REFERENCE TO RELATED APPLICATIONS

The present application is the national stage filing under 35 U.S.C. § 371 of International Application No. PCT/AU2017/050763, filed Jul. 25, 2017, which claims priority from U.S. provisional application 62/366,375 filed on 25 Jul. 2016 the content of which is incorporated herein by reference. The present application further claims priority from U.S. provisional application 62/366,406 filed on 25 Jul. 2016 the content of which is incorporated herein by reference. The present application further claims priority from Australian provisional application 2016902919 filed on 25 Jul. 2016 the content of which is incorporated herein by reference. The present application further claims priority from Australian provisional application 2016902921 filed on 25 Jul. 2016 the content of which is incorporated herein by reference.

TECHNICAL FIELD

The present disclosure generally relates to creating videos. The present disclosure includes computer-implemented methods, software, and computer systems for creating videos with facial expressions to reflect styles of individual persons.

BACKGROUND

A video document is often used to present content in relation to a "story". The content typically consists of audio and/or visual content, or both visual and audio content, for example, the video documents available at Youtube. The content presented in the video document often involves at least one character and a storyline associated with the character. The storyline is used to represent how the story develops with respect to the character over time, including what the character does and the interactions of the character with other characters in the story.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present disclosure is not to be taken as an admission that any or all of these matters form part of the prior art base or were common general knowledge in the field relevant to the present disclosure as it existed before the priority date of each claim of this application.

SUMMARY

There is provided a method for creating a video on a mobile device that comprises a camera, the method comprising:

creating a graphic user interface on the mobile device to capture by the camera multiple photographic facial images of a user for respective multiple facial expressions of a character in the video;

using the multiple photographic facial images to modify stored character images by matching facial features of the character to facial features of the user for the multiple facial expressions of the character in the video; and creating the video based on the modified character images.

There is provided a method for creating a video including a character on a mobile device that comprises a camera, the method comprising:

(a) creating a graphic user interface on the mobile device to capture by the camera multiple photographic facial images of a user for respective multiple facial expressions;

(b) extracting a user facial feature from each of the multiple photographic facial images;

(c) storing associated with a respective facial expression identifier the user facial feature from each of the multiple photographic facial images;

(d) selecting one of the multiple user facial features based on a first facial expression identifier associated with a first frame of the video;

(e) determining a transformation that transforms a reference facial feature associated with the first facial expression identifier into an approximation or representation of the selected one of the multiple user facial features;

(f) modifying, based on the transformation, a reference facial image of the character associated with the first facial expression identifier and the reference facial feature; and (g) creating the first frame of the video based on the modified reference facial image.

As can be seen from the above, the first frame of the video is created by modifying the reference facial image of the character with reference to the corresponding user facial feature. Therefore, the original character's visual style is not replaced by a given user's visual style. Instead, the facial expression of the user is used to influence the facial expression of the character. This method enables replacement of certain visual style elements with a given user's own style elements. Although this method is described with reference to facial expressions, the method is also applicable to skin tone, eye colour, etc.

The method may further comprise:

for a second facial expression identifier associated with a second frame of the video, repeating steps (d) to (g) to create the second frame of the video.

The user facial feature may comprise a set of control points.

The graphic user interface may comprise the reference facial image of the character.

The graphic user interface may comprise a live view of each of the multiple photographic facial images.

The live view may be positioned next to the camera.

The live view may be positioned next to the reference facial image of the character.

The method may further comprise superimposing the live view on the reference facial image of the character.

The method may further comprise selecting the character from a plurality of characters in the video.

The method may further comprise recording audio data associated with the user facial feature.

There is provided a computer software product, including machine-readable instructions, when executed by a processor of a mobile device, causes the processor to perform any one of the methods described above.

There is provided a mobile device for creating a video including a character, the mobile device comprising:

a camera;

a display; and a processor, the processor configured to (a) create a graphic user interface on the display of the mobile device to capture by the camera multiple photographic facial images of a user for respective multiple facial expressions;
(b) extract a user facial feature from each of the multiple photographic facial images;
(c) store associated with a respective facial expression identifier the user facial feature from each of the multiple photographic facial images;
(d) select one of the multiple user facial features based on a first facial expression identifier associated with a first frame of the video;
(e) determine a transformation that transforms a reference facial feature associated with the first facial expression identifier into an approximation or representation of the selected one of the multiple user facial features;
(f) modify, based on the transformation, a reference facial image of the character associated with the first facial expression identifier and the reference facial feature;
(g) create the first frame of the video based on the modified reference facial image; and
(h) present, on the display, the first frame of the video in the graphic user interface.

There is provided a method for creating an output frame for a character in a video, the method comprising:
determining an estimated reference facial feature of the character based on a first reference facial image and a second reference facial image of the character;
determining an estimated user facial feature of a user based on a first photographic facial image and a second photographic facial image of the user;
determining a transformation that transforms the estimated reference facial feature of the character into an approximation or representation of the estimated user facial feature of the user;
modifying, based on the transformation, a third reference facial image of the character associated with the estimated reference facial feature of the character; and
creating the output frame for the character in the video based on the modified third reference facial image.

As can be seen from the above, this method determines the estimated reference facial feature of the character and the estimated user facial feature of the user, and determines the transformation based on the estimated reference facial feature of the character and the estimated user facial feature of the user. This dramatically reduces the time required to create the output frame.

Determining the estimated reference facial feature of the character may comprise:
determining a first distance between a first reference facial feature of the first reference facial image of the character and a second reference facial feature of the second reference facial image of the character; and
determining the estimated reference facial feature of the character based on the first distance, the first reference facial feature and the second reference facial feature.

Determining the estimated reference facial feature of the character may comprise performing an interpolation operation based on the first reference facial feature and the second reference facial feature with respect to the first distance.

Determining the estimated reference facial feature of the character may comprise performing an extrapolation operation based on the first reference facial feature and the second reference facial feature with respect to the first distance.

The first reference facial feature may include a first set of control points, and the second reference facial feature may include a second set of control points, and the first distance may be indicative of a distance between the first set of control points and the second set of control points.

Determining the estimated user facial feature of the user may comprise:
determining a second distance between a user first facial feature of the first photographic facial image of the user and a user second facial feature of the second photographic facial image of the user; and
determining the estimated user facial feature based on the second distance, the user first facial feature and the user second facial feature.

Determining the estimated user facial feature of the user may comprise performing an interpolation operation based on the user first facial feature and the user second facial feature with respect to the second distance.

Determining the estimated user facial feature of the user may comprise performing an extrapolation operation based on the user first facial feature and the user second facial feature with respect to the second distance.

The user first facial feature may include a third set of control points, and the user second facial feature may include a fourth set of control points, and the second distance may be indicative of a distance between the third set of control points and the fourth set of control points.

Modifying the third reference facial image of the character may comprise transforming a first spline curve represented by the estimated reference facial feature of the character into an approximation or representation of a second spline curve represented by the estimated user facial feature of the user.

There is provided a computer software product, including machine-readable instructions, when executed by a processor of a mobile device, causes the processor to perform any one of the methods described above.

There is provided a mobile device for creating an output frame for a character in a video, the mobile device comprising:
a camera to capture a first photographic facial image and a second photographic facial image of the user;
a display; and
a processor, the processor configured to
determine an estimated reference facial feature of the character based on a first reference facial image and a second reference facial image of the character;
determine an estimated user facial feature of the user based on the first photographic facial image and the second photographic facial image of the user;
determine a transformation that transforms the estimated reference facial feature of the character into an approximation or representation of the estimated user facial feature of the user;
modify, based on the transformation, a third reference facial image of the character associated with the estimated reference facial feature of the character;
create the output frame based on the modified third reference facial image; and
present the output frame on the display.

BRIEF DESCRIPTION OF DRAWINGS

Features of the present disclosure are illustrated by way of non-limiting examples, and like numerals indicate like elements, in which.

DESCRIPTION OF EMBODIMENTS

Figure 1:
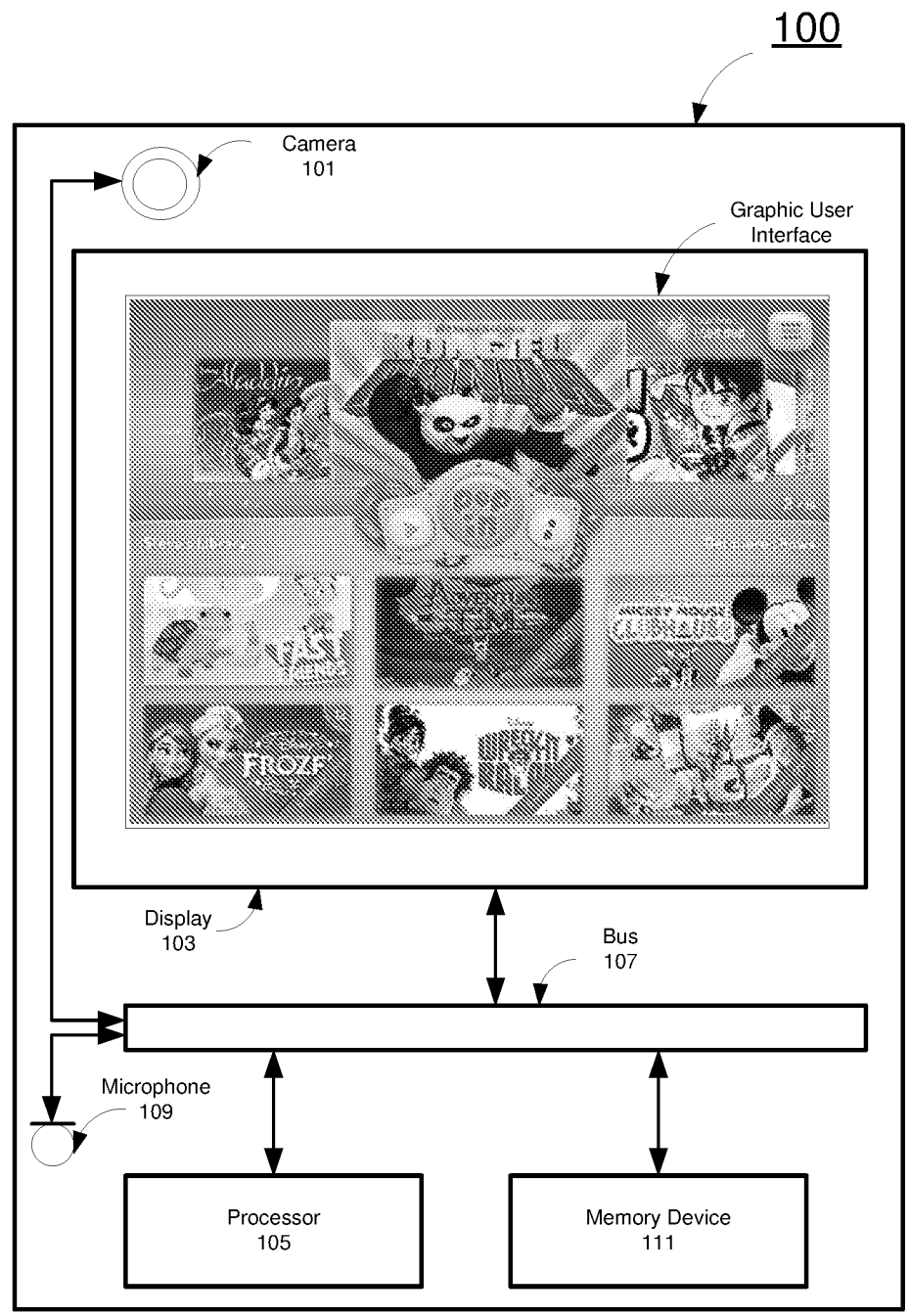
FIG. 1 illustrates an example mobile device for creating a video including a character in accordance with the present disclosure.

A video in the present disclosure consists of a sequence of images, i.e., "frames". Each frame differs in content from its adjacent frames (i.e., previous and next frames) by a small amount in terms of appearance. By displaying the sequence of frames at a high rate (e.g. 30 frames per second), a viewer of the sequence is given the impression of viewing a "movie clip".

A frame of the video includes at least two "layers" of visual content. One or more layers represent the non-replaceable content. One or more layers represent replaceable characters. A replaceable character may be replaced with user-supplied content according to the method(s) as described in the present disclosure. All layers are composited together in order to produce a processed frame, or an output frame, associated with the frame.

In addition to the visual image frame sequence, the video may also include one or more audio tracks. Typically, all but the replaceable character audio content occupies one single audio track. Additional audio tracks are used to store audio content for each replaceable character. This per-character content is then further subdivided into individual elements, each representing a "sound bite" (e.g. a short voiceover speech element, or a noise element) for that character in that specific story.

In the present disclosure, an original video document contains only original, or "reference", material. This includes replaceable and non-replaceable reference content. The replaceable reference content consists of some or all of the graphical elements for each replaceable character, saved on a frame-by-frame basis. At a minimum, this content consists of the replaceable character's head or face as it appears in each frame of the reference video content. Replaceable reference content may also include elements such as hands, feet, etc. where it may be desirable to offer the users a selectable set of display options (e.g. skin colour).

The non-replaceable visual content may consist of graphical assets, arranged as sets of assets on a per-frame basis in an animation sequence that are normally used to generate video content, but with all replaceable content removed. This form of non-replaceable visual content is packaged as a number of asset layers per frame which, when combined with the associated per-frame replaceable content, forms a complete sequence of video frames.

The non-replaceable content may alternatively consist of standard video content, with replaceable reference content masked (or removed) from each video frame. In this scenario, replaceable character audio content are extracted from the original video content. In this case, the video is deconstructed on a frame-by-frame basis, either in real time or as a separate pre-processing stage where the frames are stored in a database. In either case, the deconstructed video frames are then subsequently combined with the associated per-frame replaceable content, forming a complete sequence of video frames.

In the present disclosure, a user provides material for all replaceable content (i.e., audio and visual) for a given story. In the case of audio material, the user typically provides their own "sound bite" (voiceover, etc.) for each element in a replaceable character's audio track. In the case of user-supplied visual material, the user produces a facial expression identified by a facial expression identifier or mimics the original replaceable character's video sequence, particularly, a facial expression of the original replaceable character in a key frame at a time instant. The feature of the facial expression of the user is extracted from the user photographic image captured by the camera 101 of the mobile device 100. The feature of facial expression of the character in the key frame is also extracted. The mathematical difference between the character's feature and the user's features is then used to modify the original character's facial appearance in order to better resemble the user's facial appearance. This resemblance includes, but is not limited to, the position and shape of: eyes, eyebrows, nose, mouth, and facial outline/jawline, as described with reference FIGS. 2(a) and (b), FIGS. 3 to 6.

In another example, the user produces distinctive or representative facial expressions identified by facial expression identifiers or mimics distinctive or representative facial expressions in different key frames at different time instants. The features of the facial expression of both the user and the original replaceable character at the different time instants are extracted. The method(s) described in the present disclosure then dynamically creates a facial image of the character by using an algorithm for example, interpolation and/or extrapolation based on these facial expression features, as described with reference to FIGS. 7 and 8.

FIG. 1 illustrates an example mobile device 100 for creating a video including a character in accordance with the present disclosure. The mobile device includes a camera 101, a display 103, and a processor 105. The camera 101, the display 103 and the processor 105 are connected to each other via a bus 107. The mobile device 100 may also include a microphone 109, and a memory device 111.

The camera 101 is an optical device that captures photographic images of the user of the mobile device 100. The photographic images captured by the camera 101 are transmitted from the camera 101 to the processor 105 for further processing, or to the memory device 111 for storage.

The display 103 in this example is a screen to present visual content to the user under control of the processor 105. For example, the display 103 displays images to the user of the mobile device 100. As described above, the images can be those captured by the camera 101, or processed by the processor 105, or retrieved from the memory device 111. Further, the display 103 is able to present a graphic user interface to the user, as shown in FIG. 1. The graphic user interface includes one or more "pages". Each of the pages includes one or more graphic user interface elements, for example, buttons, menus, drop-down list, text boxes, picture boxes, etc. to present visual content to the user or to receive commands from the user, as shown in FIG. 1, which represents one of the pages included in the graphic user interface.

The display 103 can also be a screen with a touch-sensitive device (not shown in FIG. 1). A virtual keyboard is displayed on the display 103, and the display 103 is able to receive commands through the touch-sensitive device when the user touches the virtual keys of the virtual keyboard, as shown in FIG. 3(c).

The memory device 111 is a computer-readable medium that stores a computer software product. The memory device 111 can be part of the processor 105, for example, a Random Access Memory (RAM) device, a Read Only Memory (ROM) device, a FLASH memory device, which is integrated with the processor 105.

The memory device 111 can also be a device separate from the processor, for example, a floppy disk, a hard disk, an optical disk, a USB stick. The memory device 111 can be directly connected to the bus 107 by inserting the memory device 111 into an appropriate interface provided by the bus 107. In another example, the memory device 111 is located remotely and connected to the bus 107 through a communication network (not shown in FIG. 1). The computer software product stored in the memory device 111 is downloaded, through the communication network, to the processor 105 for execution.

The computer software product includes machine-readable instructions. The processor 105 of the mobile device 100 loads the computer software product from the memory device 111 and reads the machine-readable instructions included in the computer software product. When these machine-readable instructions are executed by the processor 105, these instructions cause the processor 105 to perform one or more method steps described below.

Figure 2:
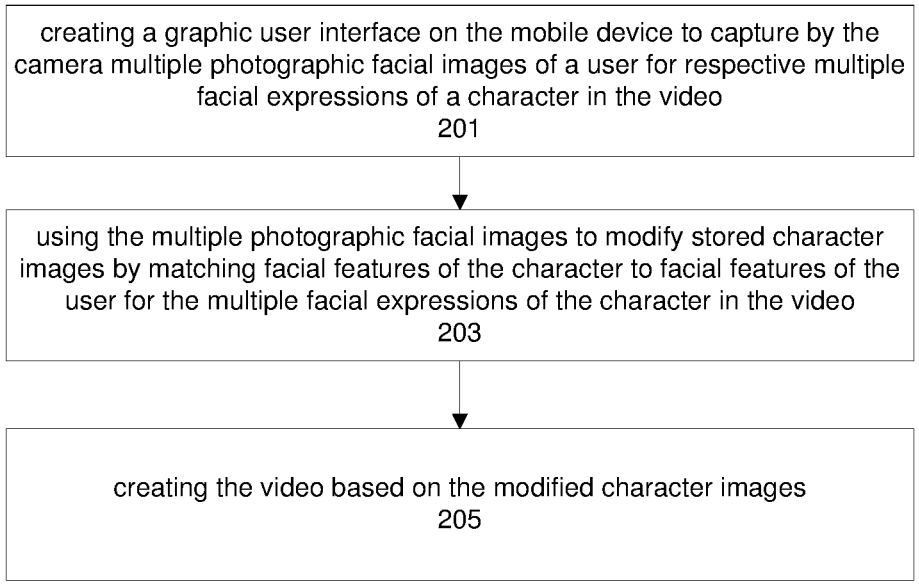
FIGS. 2(a) and 2(b) illustrate example methods for creating a video including a character on the mobile device in accordance with the present disclosure.

FIG. 2(a) illustrates an example method 200 for creating a video including a character on the mobile device 100. The method 200 is performed by the processor 105 of the mobile device 100. Particularly, the processor 105 is configured to create 201 a graphic user interface on the mobile device 100 to capture by the camera 101 multiple photographic facial images of a user for respective multiple facial expressions of the character in the video;

use 203 the multiple photographic facial images to modify stored character images by matching facial features of the character to facial features of the user for the multiple facial expressions of the character in the video; and create 205 the video based on the modified character images.

FIG. 2(b) illustrates another example method 210 for creating a video including a character on the mobile device 100. The method 210 is performed by the processor 105 of the mobile device 100. Particularly, the processor 105 is configured to (a) create 211 a graphic user interface on the mobile device 100 (particularly, the display 103 of the mobile 100) to capture by the camera 101 multiple photographic facial images of a user for respective multiple facial expressions;

(b) extract 213 a user facial feature from each of the multiple photographic facial images;

(c) store 215 associated with a respective facial expression identifier the user facial feature from each of the multiple photographic facial images;

(d) select 217 one of the multiple user facial features based on a first facial expression identifier associated with a first frame of the video;

(e) determine 219 a transformation that transforms a reference facial feature associated with the first facial expression identifier into an approximation or representation of the selected one of the multiple user facial features;

(f) modify 221, based on the transformation, a reference facial image of the character associated with the first facial expression identifier and the reference facial feature; and (g) create 223 the first frame of the video based on the modified reference facial image.

The processor 105 is also configured to present, on the display 103, the first frame of the video in the graphic user interface.

For a second facial expression identifier associated with a second frame of the video, the processor 105 repeats steps (d) to (g) to create the second frame of the video.

As can be seen from the above, the first frame of the video is created by modifying the reference facial image of the character with reference to the corresponding user facial feature. Therefore, the original character's visual style is not replaced by a given user's visual style. Instead, the facial expression of the user is used to influence the facial expression of the character. This method enables replacement of certain visual style elements with a given user's own style elements. Although this method is described with reference to facial expressions, the method is also applicable to skin tone, eye colour, etc.

In the case of skin tone, for example, multiple sets of identical replaceable reference character content are supplied with the reference material package for a given story, with each set differing only in skin tone. In that way, the user alters the reference character's skin tone to mimic their own simply by selecting from a set of alternate skin tone options. The selected set of reference character content is subjected to the similar feature transformation as described above, which creates a character that is more similar in shape and colour to the user's own appearance.

The content generated by the method(s) described in the present disclosure is significantly personalised for each user, and it is constructed "on demand" in real time from sets of associated asset elements. The resulting content (a sequence of frames) can then be immediately displayed on a device. Alternatively, the generated content may be used to produce a final multimedia asset such as a static, viewable Youtube asset.

Figure 3:
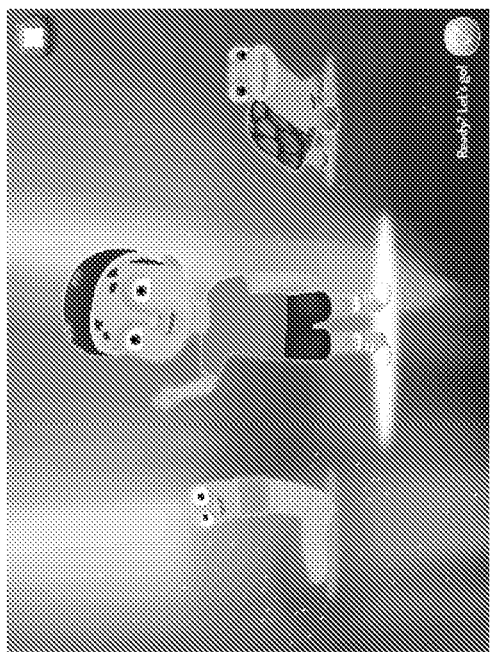
FIG. 3 illustrates a graphic user interface in accordance with the present disclosure.
Figure 3:
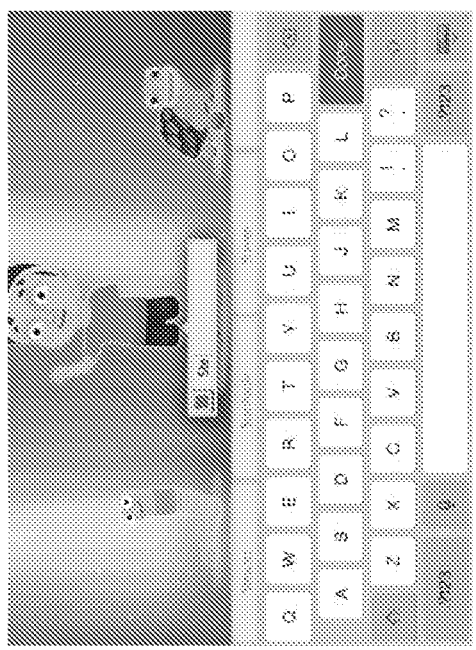
Figure 3:
Figure 3:
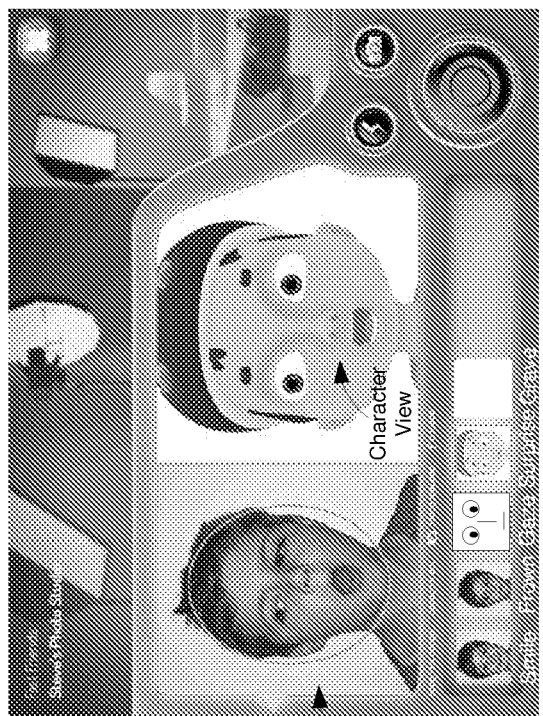
Figure 3:
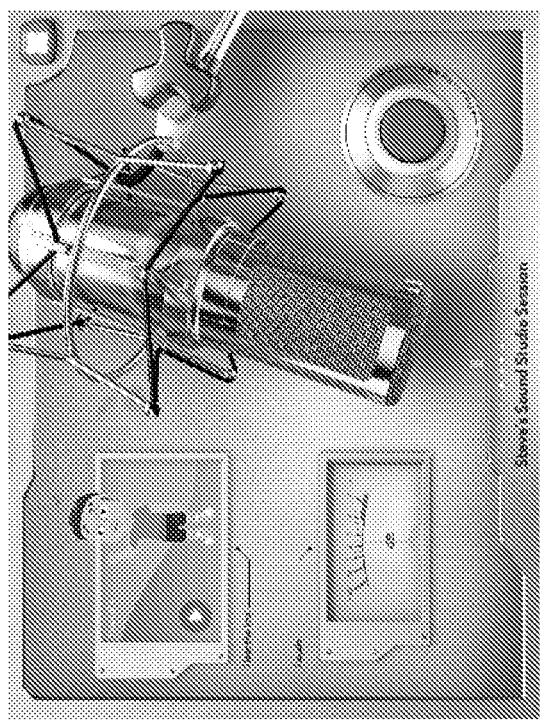
Figure 3:
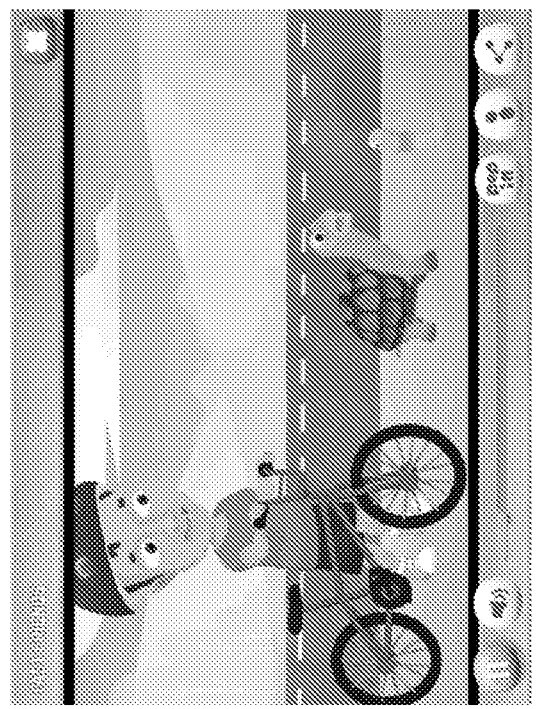

FIG. 3 illustrates the graphic user interface in accordance with the present disclosure.

The processor 103 creates 211 a graphic user interface on the mobile device 100 to capture by the camera 101 multiple photographic facial images of a user for respective multiple facial expressions.

The graphic user interface starts with page (a) as shown in FIG. 3, which presents on the display 103 a movie library consisting of one or more movies. As shown in page (a), there are multiple movies available for the user to choose to work on, for example, "Kong Fu Panda", "Fast Friends", "Frozen", etc. The user chooses "Fast Friends", and the graphic user interface proceeds to page (b). Page (b) shows a plurality of characters in this movie, for example, a boy, a turtle, and a worm. The user can select one of the characters by touching the character. The user can also select one of the characters by entering the name of the character through a virtual keyboard presented in the graphic user interface, as shown in page (c). In the example shown in page (c), the character of the boy is selected by the user. Upon selection of the character, the graphic user interface proceeds to page (d).

Page (d) shows a list of facial expression identifiers to identify facial expressions. The facial expression identifiers serve the purpose of guiding the user to produce facial expressions identified by the facial expression identifiers. A facial expression identifier can be a text string indicative of the name of a facial expression, for example, "Smile", "Frown", "Gaze", "Surprise", and "Grave", as shown in page (d). The facial expression identifier can include an icon, for example, the icon for facial expression "Gaze". The facial expression identifier can also include a reference facial image of the character extracted from movie, for example, the facial image of the character in a frame of the movie where the character is "surprised", which makes it easier for the user to produce the corresponding facial expression. The facial expression identifier can take other forms without departing from the scope of the present disclosure.

As shown in page (d), the user is producing a facial expression identified by a text string "Surprise" with a reference facial image of the character. The user recognises the facial expression identifier and produces the corresponding facial expression. The facial image of the user is captured by the camera 101 and presented in a live view of the graphic user interface. The live view of the user's facial image is positioned next to the camera 101 to alleviate the issue where the user does not appear to look at the camera 101 when the user is looking at the live view. The processor 105 also displays the reference facial image of the character in a character view of the graphic user interface. The live view is also positioned next to the reference facial image of the character to make it easier for the user to compare the facial expression of the user and the facial expression of the character. In another example, the processor 105 further superimposes the live view of the facial image of the user on the reference facial image of the character to make it even easier for the user to compare the facial expression of the user and the facial expression of the character.

If the user, or another person (for example, a director), is satisfied with the facial expression of the user, the user or the other person clicks on the shutter button of the graphic user interface to capture the photographic facial image of the user. The photographic facial image of the user can be displayed in a picture box associated with the facial expression identifier. For example, the photographic facial images of the user for facial expressions "Smile" and "Frown" are displayed in respective picture boxes, as shown in page (d).

In another example, instead of taking photos of the user, the processor 105 may retrieve photographic facial images of the user that have been stored in the memory device 111 and associate the photographic facial images with the corresponding facial expression identifiers.

The photographic facial image of the user is transmitted from the camera 101 to the processor 105. The processor 105 extracts 213 a user facial feature "U4" from the photographic facial image corresponding to the facial expression identifier "Surprise". The processor 105 stores 215 in a user feature table associated with the facial expression identifier "Surprise" the user facial feature "U4", as shown in the fourth entry of the user feature table below.

User Feature Table

| Expression ID | User Facial Feature | User Sound |
| --- | --- | --- |
| Smile | U1 | S1 |
| Frown | U2 | S2 |
| Gaze | U3 | S3 |
| Surprise | U4 | S4 |
| Grave | U5 | S5 |

On page (e) of the graphic user interface, the processor 105 records, through the microphone 109, audio data "S4" associated with the user facial feature "U4". The processor 105 further stores the audio data "S4" in the user feature table in association with the facial expression identifier "Surprise", as shown in the fourth entry of the user feature table below.

The processor 105 repeats the above steps for each expression identifier in page (d), and populates the user feature table for the character of the boy, which associates the facial expression identifiers with the corresponding user facial features and audio data. For other characters in the movie, the processor 105 can similarly generates respective user feature table for those characters.

Figure 4:
FIGS. 4 and 5 illustrate facial features in accordance with the present disclosure.
Figure 4:
Figure 5:
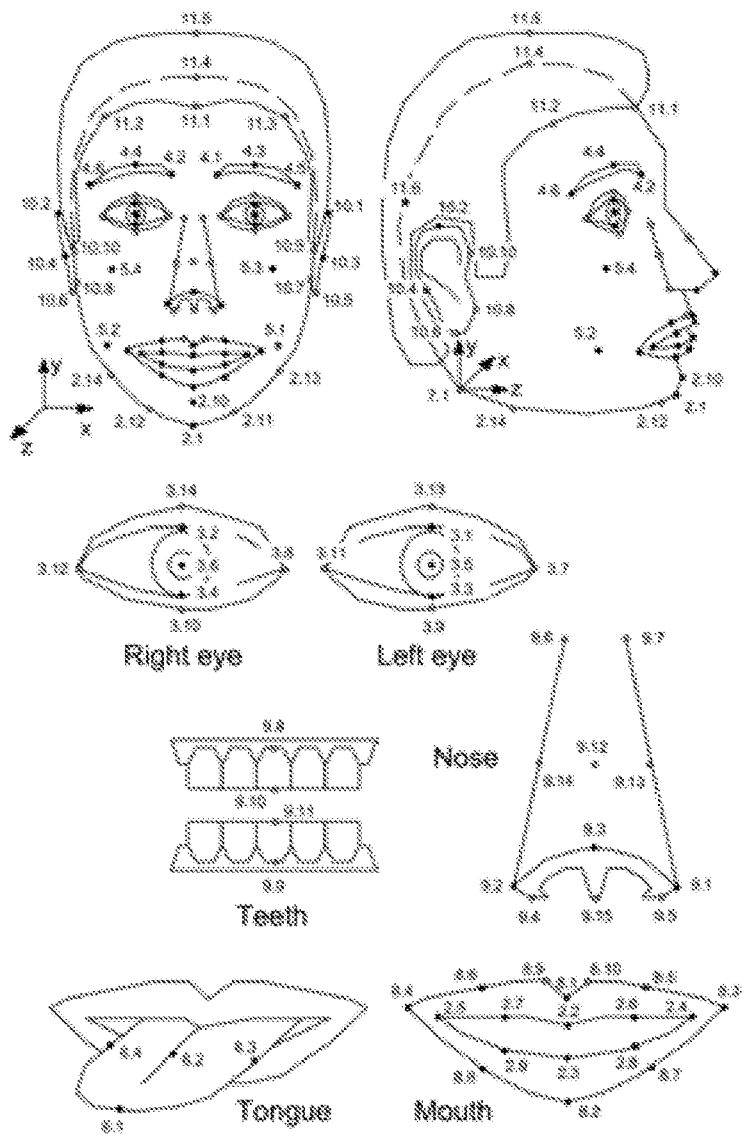

FIGS. 4 and 5 illustrate facial features in accordance with the present disclosure.

Facial features in the present disclosure include a set of control points. FIG. 4(a) represents a facial image of an object, which is captured by a camera. The object in the present disclosure can be a user or a character in a movie. The facial image in FIG. 4(a) shows the object to be generally front-facing such that all key areas of the face are visible: [both] eyes, [both] eyebrows, nose, mouth, and jawline. Ideally, these areas should be largely unobstructed.

The dots in FIG. 4(b) represents a set of control points extracted by the processor 105. A third party software library is used to extract the set of points from the facial image shown in FIG. 4(a). There are a number of public domain libraries available for this purpose, some of which are based on the open source "OpenCV" library. The set of control points that are extracted from the facial image may comply with an industry standard, for example, MPEG-4, ISO/IEC 14496-1, 14496-2, etc. For example, the control points shown in FIG. 5 comply with the MPEG-4 standard. The facial shape of the object may be reconstructed by connecting those controls with segments. In another example, the facial shape may also be reconstructed by using one or more spline curves that are based on those control points.

Figure 6:
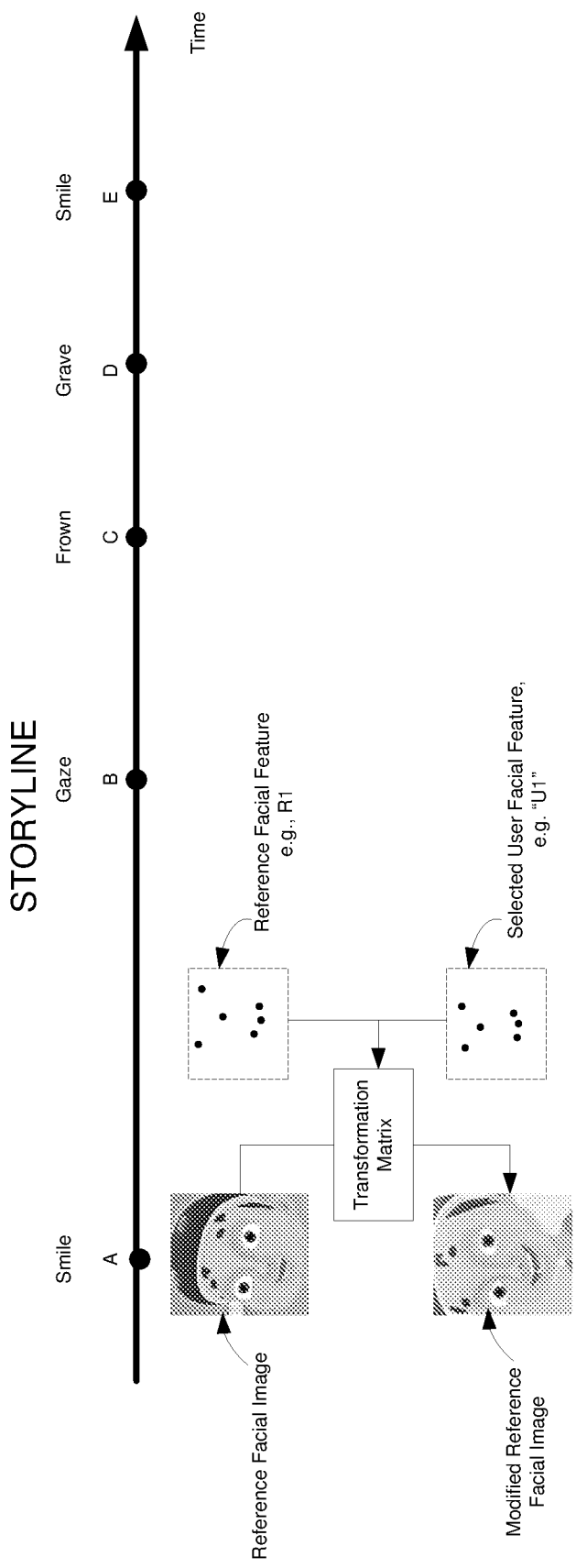
FIG. 6 illustrates a detailed process for creating a video including a character on the mobile device in accordance with the present disclosure.

FIG. 6 illustrates a detailed process 400 for creating a video including a character on the mobile device 100 in accordance with the present disclosure.

For description purposes, a storyline is shown in FIG. 6 to indicate a sequence of facial expression identifiers of the character of the boy over time. Particularly, there are five facial expression identifiers labelled along the storyline at five time instants "A" to "E", which are "Smile", "Gaze", "Frown", "Grave", and "Smile". These facial expression identifiers indicate the facial expressions of the character in the frames at the five time instants. The processor 105 also extracts frames at the five time instants from the video document of the movie "Fast Friends". The frame at time instant "A" contains a facial image of the character that corresponds to the facial expression identified by the facial expression identifier "Smile". The facial image of the character at time instant "A" is also shown in FIG. 6 for description purposes. The processor 105 extracts a facial expression feature "R1" from the facial image of the character as a reference facial feature associated with the facial expression identifier "Smile". The facial image of the character at time instant "A" is used as a reference facial image associated with the facial expression identifier "Smile" and the reference facial feature "R1".

Referring to the user feature table, the processor 105 selects 217 one of the multiple user facial features based on the facial expression identifier "Smile" associated with the frame at time instant "A" in the video. In this example, the processor 105 selects a user facial feature "U1" since the user facial feature "U1" is associated with the facial expression identifier "Smile" in the user feature table. The processor 105 may further select audio data "S1" associated with the facial expression identifier "Smile".

The processor 105 determines 219 a transformation that transforms the reference facial feature "R1" associated with the facial expression identifier "Smile" into an approximation or representation of the selected user facial feature "U1". For example, the transformation can be a transformation matrix that transforms the control points of the reference facial feature "R1" into an approximation or representation of the control points of the selected user facial feature "U1".

The processor 105 modifies 221, based on the transformation, the reference facial image associated with the facial expression identifier "Smile" and the reference facial feature "R1". Particularly, the processor 105 may modify the reference facial image by changing the positions of pixels in the reference facial image based on the transformation. The processor 105 then creates 223 the frame at time instant "A" of the video based on the modified reference facial image by for example combining the modified reference facial image and the selected audio data "S1" associated with the facial expression identifier "Smile".

While the user-recorded audio data may be associated with a facial expression, the audio data may equally be independent from the facial expressions but otherwise associated with the story line. For example, the user may record audio data for what the character says in a particular scene where no facial expression identifier is associated with frames in that scene. It is noted that the proposed methods and systems may perform only the disclosed face modification techniques or only the audio voice-over techniques or both.

The processor 105 repeats the above process for each of the characters contained in the frame at time instant "A" and/or each of the frames at the five time instants "A" to "E" along the storyline. As a result, the frames at those time instants in the video contain personal expression features of the user, and thus the video becomes more personalised and user-friendly when played, as shown on page (f) of the graphic use interface shown in FIG. 3. It can be seen from page (f) that the shape of the face of the character is more like the user's actual face than the original character's face is.

Figure 7:
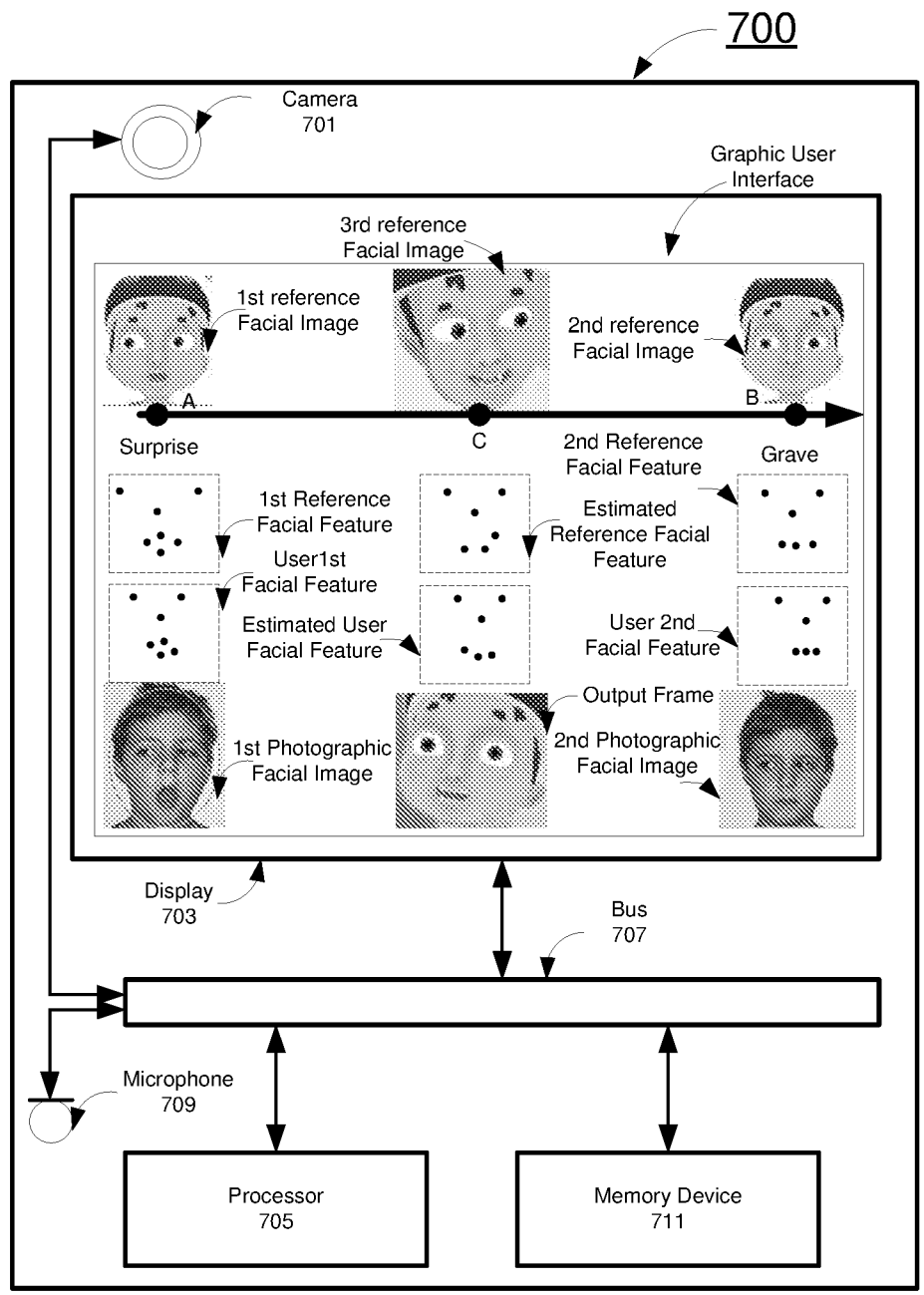
FIG. 7 illustrate an example mobile device for creating an output frame for a character in a video in accordance with the present disclosure.

FIG. 7 illustrates an example mobile device 700 for creating an output frame for a character in a video in accordance with the present disclosure. The mobile device 700 includes a camera 701, a display 703, and a processor 705. The camera 701, the display 703 and the processor 705 are connected to each other via a bus 707. The mobile device 700 may also include a microphone 709, and a memory device 711.

The camera 701 is an optical device that captures photographic images of the user of the mobile device 700. The photographic images captured by the camera 701 are transmitted from the camera 701 to the processor 705 for further processing, or to the memory device 711 for storage.

The display 703 in this example is a screen to present visual content to the user under control of the processor 705. For example, the display 703 displays images to the user of the mobile device 700. As described above, the images can be those captured by the camera 701, or processed by the processor 705, or retrieved from the memory device 711. Further, the display 703 is able to present a graphic user interface to the user, as shown in FIG. 7.

The memory device 711 is a computer-readable medium that stores a computer software product. The memory device 711 can be part of the processor 705, for example, a Random Access Memory (RAM) device, a Read Only Memory (ROM) device, a FLASH memory device, which is integrated with the processor 105.

The memory device 711 can also be a device separate from the processor, for example, a floppy disk, a hard disk, an optical disk, a USB stick. The memory device 711 can be directly connected to the bus 707 by inserting the memory device 711 into an appropriate interface provided by the bus 707. In another example, the memory device 711 is located remotely and connected to the bus 707 through a communication network (not shown in FIG. 7). The computer software product stored in the memory device 711 is downloaded, through the communication network, to the processor 705 for execution.

The computer software product includes machine-readable instructions. The processor 705 of the mobile device 700 loads the computer software product from the memory device 711 and reads the machine-readable instructions included in the computer software product. When these machine-readable instructions are executed by the processor 705, these instructions cause the processor 705 to perform one or more method steps described below.

Figure 8:
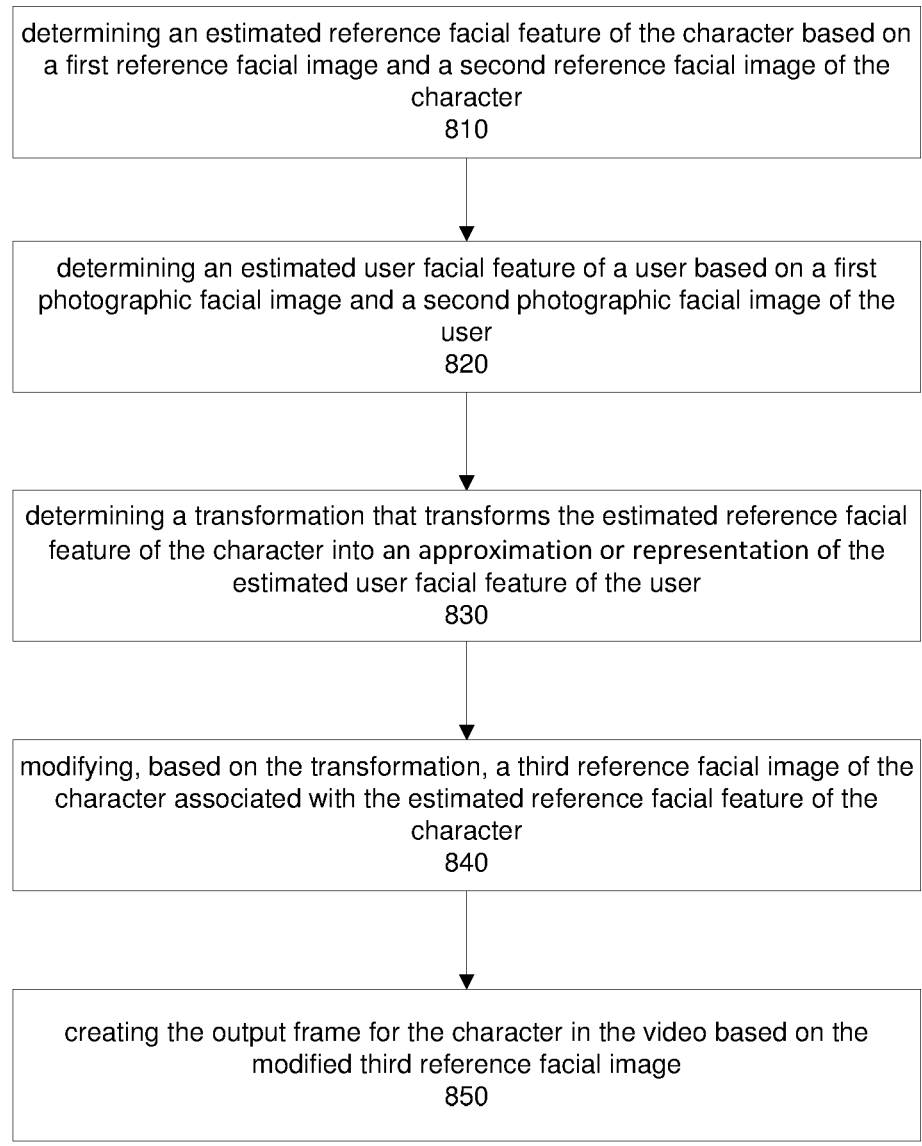
FIG. 8 illustrates an example method for creating an output frame for a character in a video in accordance with the present disclosure.

FIG. 8 illustrates an example method 800 for creating an output frame for a character in a video in accordance with the present disclosure. The method 800 is used to create an output frame based on a first reference facial image and a second reference facial image of the character. The first reference facial image of the character is in a first key frame of the video, and the second reference facial image of the character is in a second key frame of the video. The output frame can be a frame between the first key frame and the second key frame along the storyline, or outside the first key frame and the second key frame along the storyline. The method 800 is performed by the processor 705 of the mobile device 700.

The camera 701 of the mobile device 700 captures a first photographic facial image and a second photographic facial image of the user, and the processor 705 is configured to determine 810 an estimated reference facial feature of the character based on the first reference facial image and the second reference facial image of the character;

determine 820 an estimated user facial feature of the user based on the first photographic facial image and the second photographic facial image of the user;

determine 830 a transformation that transforms the estimated reference facial feature of the character into an approximation or representation of the estimated user facial feature of the user;

modify 840, based on the transformation, a third reference facial image of the character associated with the estimated reference facial feature of the character; and create 850 the output frame based on the modified third reference facial image.

The processor 705 is further configured to present the output frame on the display 103.

As can be seen from the above, the method 800 determines the estimated reference facial feature of the character and the estimated user facial feature of the user, and determines the transformation based on the estimated reference facial feature of the character and the estimated user facial feature of the user. This dramatically reduces the time required to create the output frame. A detailed process for creating the output frame is described below.

As shown in FIG. 7, two time instants "A", "B" along the storyline are selected by the user or the director as the facial expressions of the character at these time instants are distinctive or representative. The facial expressions of the character at the time instants "A", "B" are identified as "Surprise" and "Grave", respectively. A facial image of the character is extracted from the first key frame at time instant "A", and is referred to as a first reference facial image. A facial image of the character is extracted from the second key frame at time instant "B", and is referred to as a second reference facial image. Both reference facial images of the character are shown in the graphic user interface for the user's reference.

The processor 705 determines 810 an estimated reference facial feature of the character based on the first reference facial image and the second reference facial image of the character. Particularly, the processor 705 extracts a reference facial feature of the character from the first reference facial image of the character, referred to as a first reference facial feature. The processor 705 also extracts a reference facial feature of the character from the second reference facial image of the character, referred to as a second reference facial feature.

The processor 705 further determines a first distance between the first reference facial feature of the first reference facial image and the second reference facial feature of the second reference facial image. The processor 705 determines the estimated reference facial feature of the character based on the first distance, the first reference facial feature and the second reference facial feature. As described above, the first reference facial feature includes a first set of control points, and the second reference facial feature includes a second set of control points. As a result, the first distance is indicative of a distance between the first set of control points and the second set of control points.

If the output frame is between the first key frame and the second key frame, for example, time instant "C" between time instants "A", "B", the processor 705 determines the estimated reference facial feature of the character by performing an interpolation operation based on the first reference facial feature and the second reference facial feature with respect to the first distance.

On the other hand, if the output frame is outside the first key frame and the second key frame, the processor 705 determines the estimated reference facial feature of the character by performing an extrapolation operation based on the first reference facial feature and the second reference facial feature with respect to the first distance.

The user recognises the first facial expression identifier "Surprise" and/or observes the first reference facial image of the character (i.e., the facial image of the character at time instant "A"), and produces a facial expression that corresponds to the first facial expression identifier "Surprise". If the user or the director is satisfied with the facial expression of the user, a facial image of the user is captured by the camera 701, referred to as a first photographic facial image.

Similarly, the user recognises the second facial expression identifier "Grave" and/or observes the second reference facial image of the character (i.e., the facial image of the character at time instant "B"), and produces a facial expression that corresponds to the second facial expression identifier "Grave". If the user or the director is satisfied with the facial expression of the user, a facial image of the user is captured by the camera 701, referred to as a second photographic facial image.

In another example, instead of taking photos of the user, the processor 705 may retrieve photographic facial images of the user that have been stored in the memory device 711 and associate the photographic facial images with the corresponding facial expression identifiers.

Both the first photographic facial image and the second photographic facial image of the user are transmitted from the camera 701 to the processor 705.

The processor 705 determines 820 an estimated user facial feature of a user based on the first photographic facial image and the second photographic facial image of the user. Particularly, the processor 705 extracts a facial feature from the first photographic facial image of the user, referred to as a user first facial feature. The processor 705 also extracts a facial feature from the second photographic facial image of the user, referred to as a user second facial feature.

The processor 705 further determines a second distance between the user first facial feature and the user second facial feature. The processor 705 determines the estimated user facial feature of the user based on the second distance, the user first facial feature and the user second facial feature. As described above, the user first facial feature includes a third set of control points, and the user second facial feature includes a fourth set of control points. As a result, the second distance is indicative of a distance between the third set of control points and the fourth set of control points.

If the output frame is between the first key frame and the second key frame, for example, time instant "C" between time instants "A", "B", the processor 705 determines the estimated user facial feature of the user by performing an interpolation operation based on the user first facial feature and the user second facial feature with respect to the second distance.

On the other hand, if the output frame is outside the first key frame and the second key frame, the processor 705 determines the estimated user facial feature of the user by performing an extrapolation operation based on the user first facial feature and the user second facial feature with respect to the second distance.

Figure 9:
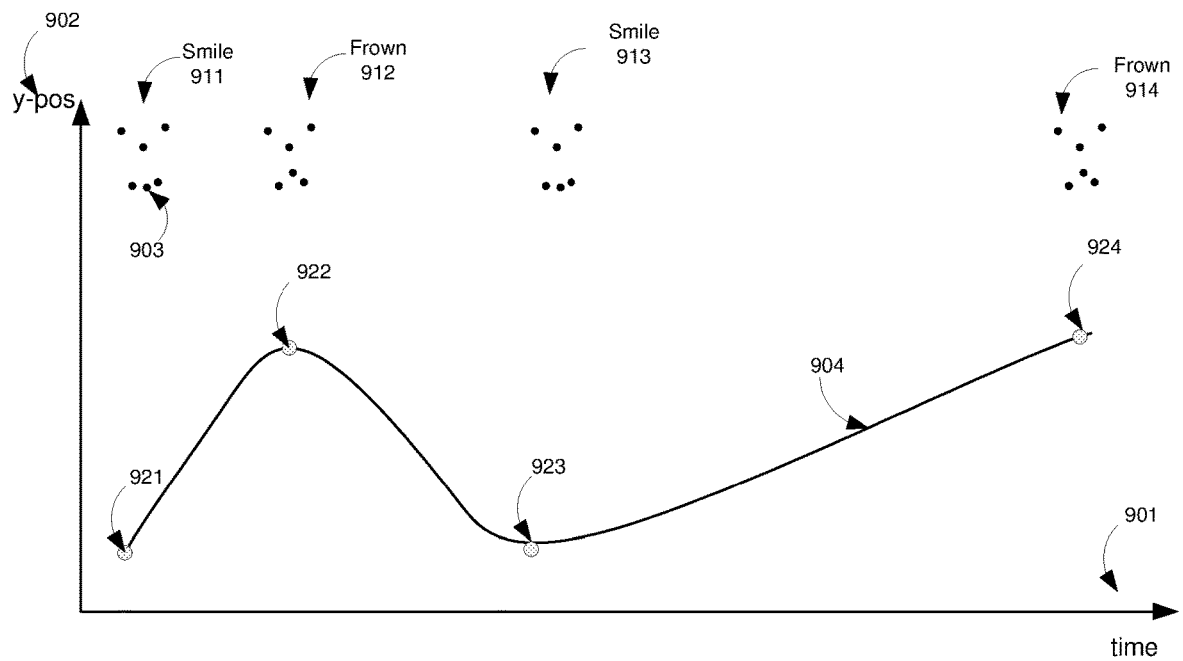
FIG. 9 illustrates an interpolation process.

FIG. 9 illustrates the interpolation process 900 in more detail. In this example, the storyline 901 is annotated with facial expression identifiers and FIG. 9 also shows the corresponding control points of the facial features. The y-axis 902 indicates the y-position of the central control point 903 of the lips. In this example, the storyline evolves from a smile 911 to a frown 912 back to a smile 913 and finally into a frown 914 again. Correspondingly, the control point 903 starts from a low position 921 into a high position 922, back to a low position 923 and finally into a high position 924. For the frames between the smile 911 and the frown 912, processor 705 may interpolate the y-position of control point 903 using a linear interpolation method. In some examples, however, this may lead to an unnatural appearance at the actual transition points, such as a sharp corner at point 922. Therefore, processor 704 may generate a spline interpolation 904 using the y-coordinates of the points 921, 922, 923 and 924 as knots. This results in a smooth transition between the facial expressions. While control point 903 moves only in y-direction in this example, control points are generally allowed to move in both dimensions. Therefore, the spline curve 904 may be a two-dimensional spline approximation of the knots to allow the processor 705 to interpolate both x- and y-coordinates.

The processor 705 determines 830 a transformation that transforms the estimated reference facial feature of the character into an approximation or representation of the estimated user facial feature of the user. As described above, the transformation can be a transformation matrix that transforms the control points of the estimated reference facial feature of the character into an approximation or representation of the control points of the estimated user facial feature of the user.

If the output frame is between the first key frame and the second key frame, for example, time instant "C" between time instants "A", "B", the processor 705 determines a further reference facial image of the character by performing an interpolation operation based on the first reference facial image and the second reference facial image of the character, referred to as a third reference facial image. The third reference facial image is associated with the estimated reference facial feature of the character.

On the other hand, if the output frame is outside the first key frame and the second key frame, the processor 705 determines the third reference facial image of the character by performing an extrapolation operation based on the first reference facial image and the second facial image.

The processor 705 modifies 840, based on the transformation, the third reference facial image of the character by for example changing the positions of pixels in the third reference facial image. Since the estimated reference facial feature of the character may represent a spline curve, referred to as a first spline curve, and the estimated user facial feature of the user may represent another spline curve, referred to as a second spline curve, modifying the third reference facial image of the character also results in transforming the first spline curve into an approximation or representation of the second spline curve.

The processor 705 repeats the above steps for each of the characters in the first key frame and the second key frame, and creates 850 the output frame for the characters in the video based on the modified third reference facial images for those characters. For example, the processor 705 may create the output frame by combining the modified third reference facial images into the output frame.

Figure 10:
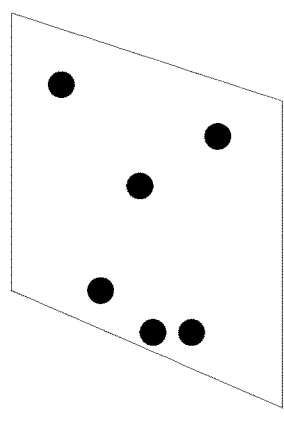
FIG. 10 shows (a) a transformation of the 2D coordinate of the control points to create the impression of a 3D rotation of the character's face, and (b) a simplified 3D model of a character's head.
Figure 10:
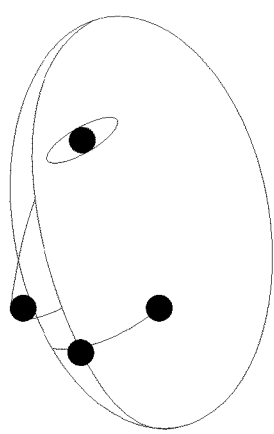

Once the output frame is created, processor 750 may apply a perspective transformation on the output frame. Since the output movie is ultimately displayed on the 2D device, processor 750 applies the transformation on 2D coordinates of control points to create the impression of a 3D rotation. FIG. 10(*a*) shows a transformation of the 2D coordinates of the control points to create the impression of a 3D rotation of the character's face. The degree of rotation may be known from the storyline and therefore, processor 750 calculates a transformation that creates the corresponding impression. This transformation may also be integrated into the previous transformation applied to the reference image. Processor 750 may also create the impression of perspective by down-scaling points that are further away from the virtual camera.

FIG. 10*b* illustrates a simplified 3D model of a character's head. This 3D model may be created by a designer or developer once for each character. Based on the 3D model, processor 750 can calculate which control points are not visible because they are occluded by other parts of the head. In the example of FIG. 10(*b*), the right eye is occluded and not visible. Applying this calculation to the output image to hide the parts of the images that are not visible according to the 3D model, increases the realistic impression of the created video. The calculation may be based on an assumed pivot point, that may be the top of the neck. The processor 750 can then perform the transformation based on rotation and tilt around the pivot point.

Both processes in FIGS. 10(*a*) and 10(*b*) may be performed on the control points only. The reference image can then be transformed as described above, which creates the impression of a 3D rotation of the reference image at the same time as making the reference image similar to the user's face geometry.

It should be understood that the example methods of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as internet.

It should also be understood that, unless specifically stated otherwise as apparent from the following discussion, it is appreciated that throughout the description, discussions utilizing terms such as "determining", "obtaining", or "receiving" or "sending" or "authenticating" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The invention claimed is:

1. A method for creating an output frame for a character in a video between a first frame and a second frame, the method comprising:
   determining an estimated reference facial feature, comprising control points, of the character based on a first reference facial image of the character in the first frame and a second reference facial image of the character in the second frame by interpolating between control points of the character in the respective first frame and second frame;
   determining an estimated user facial feature, comprising control points, of a user based on a first photographic facial image and a second photographic facial image of the user by interpolating between control points of the user in the respective first photographic facial image and the second photographic image;
   determining a transformation that transforms the estimated reference facial feature of the character into an approximation or representation of the estimated user facial feature of the user;
   modifying, based on the transformation, a third reference facial image of the character associated with the estimated reference facial feature of the character; and
   creating the output frame between the first frame and the second frame for the character in the video based on the modified third reference facial image.

2. The method of claim 1, wherein determining the estimated reference facial feature of the character comprises:
   determining a first distance between a first reference facial feature of the first reference facial image of the character and a second reference facial feature of the second reference facial image of the character; and
   determining the estimated reference facial feature of the character based on the first distance, the first reference facial feature and the second reference facial feature.

3. The method of claim 2, wherein determining the estimated reference facial feature of the character comprises performing an interpolation operation based on the first reference facial feature and the second reference facial feature with respect to the first distance.

4. The method of claim 2, wherein determining the estimated reference facial feature of the character comprises performing an extrapolation operation based on the first reference facial feature and the second reference facial feature with respect to the first distance.

5. The method of claim 2, wherein the first reference facial feature includes a first set of control points, and the second reference facial feature includes a second set of control points, and the first distance is indicative of a distance between the first set of control points and the second set of control points.

6. The method of claim 2, wherein determining the estimated user facial feature of the user comprises:
   determining a second distance between a user first facial feature of the first photographic facial image of the user and a user second facial feature of the second photographic facial image of the user; and
   determining the estimated user facial feature based on the second distance, the user first facial feature and the user second facial feature.

7. The method of claim 6, wherein determining the estimated user facial feature of the user comprises performing an interpolation operation based on the user first facial feature and the user second facial feature with respect to the second distance.

8. The method of 6, wherein determining the estimated user facial feature of the user comprises performing an extrapolation operation based on the user first facial feature and the user second facial feature with respect to the second distance.

9. The method of 6, wherein the user first facial feature includes a third set of control points, and the user second facial feature includes a fourth set of control points, and the second distance is indicative of a distance between the third set of control points and the fourth set of control points.

10. The method of claim 9, wherein modifying the third reference facial image of the character comprises transforming a first spline curve represented by the estimated reference facial feature of the character into an approximation or representation of a second spline curve represented by the estimated user facial feature of the user.

11. A computer software product, including machine-readable instructions, when executed by a processor of a mobile device, that causes the processor to perform the method of claim 1.

12. A mobile device for creating an output frame for a character in a video between a first frame and a second frame, the mobile device comprising:
   a camera to capture a first photographic facial image and a second photographic facial image of the user;
   a display; and
   a processor, the processor configured to:
      determine an estimated reference facial feature, comprising control points, of the character based on a first reference facial image of the character in the first frame and a second reference facial image of the character in the second frame by interpolating between control points of the character in the respective first frame and second frame;
      determine an estimated user facial feature, comprising control points, of the user based on the first photographic facial image and the second photographic facial image of the user by interpolating between control points of the user in the respective first photographic facial image and the second photographic image;
      determine a transformation that transforms the estimated reference facial feature of the character into an approximation or representation of the estimated user facial feature of the user;
      modify, based on the transformation, a third reference facial image of the character associated with the estimated reference facial feature of the character;
      create the output frame between the first frame and the second frame based on the modified third reference facial image; and
      present the output frame on the display.

* * * * *